United States Patent [19]

Cowett, Jr.

[11] 4,017,780

[45] Apr. 12, 1977

[54] DYNAMIC TEMPERATURE COMPENSATING CIRCUIT FOR POWER TRANSISTOR CONVERTERS

[75] Inventor: Philip M. Cowett, Jr., Olney, Md.

[73] Assignee: The United States of America as represented by the Secretary of the Army, Washington, D.C.

[22] Filed: Dec. 16, 1975

[21] Appl. No.: 641,312

[52] U.S. Cl. .................................... 321/2; 331/70; 331/113 A
[51] Int. Cl.² ........................................ H02M 3/335
[58] Field of Search .............. 321/2, 12, 45 R; 331/70, 113 A

[56] References Cited

UNITED STATES PATENTS

| | | |
|---|---|---|
| 3,289,105 | 11/1966 | Funfstuck ........................ 321/2 |
| 3,629,725 | 12/1971 | Chun ............................. 321/45 R |
| 3,769,545 | 10/1973 | Crane ............................ 331/113 A |

Primary Examiner—William H. Beha, Jr.
Attorney, Agent, or Firm—Nathan Edelberg; Robert P. Gibson; Saul Elbaum

[57] ABSTRACT

A dynamic temperature compensating circuit is disclosed for driving the bases of a first and a second transistor connected in the common-emitter configuration, having collector-emitter paths of the two transistors connected together in a current loop. The circuit employs diodes arranged in parallel in the base-emitter drive circuit of each transistor, to clamp the transistors on or off at appropriate times. The diodes and transistors are composed of the same type of semi-conductor material so that their respective forward bias potentials maintain equal magnitudes over a range of temperatures. The circuit has particular application in D.C.–A.C. and D.C.–D.C. converters.

13 Claims, 2 Drawing Figures

DYNAMIC TEMPERATURE COMPENSATING CIRCUIT FOR POWER TRANSISTOR CONVERTERS

The invention described herein may be manufactured, used and licensed by or for the United States Government for governmental purposes without the payment to me of any royalty thereon.

FIELD OF THE INVENTION

This invention generally relates to temperature compensating circuits and more particularly relates to the provision of a temperature compensating circuit for a power supply system.

BACKGROUND OF THE INVENTION

Prior art converter designs make use of a standard common-emitter transistor D.C.-D.C. converter having the collector-emitter paths of two transistors connected together in a current loop including an output transformer. Such converters employ a base drive circuit including a feedback winding coupled to the base of each transistor to effect oscillation of the converter. Prior art D.C.—D.C. converters employ a fast-rise time square wave circuit to drive the bases of the common-emitter coupled transistors. In such a conventional converter circuit, the fast-rise base driving waveform produces a corresponding fast-rise collector waveform which, in turn, produces high frequency harmonics of the switching waveform which are difficult to filter out and which propagate through the circuit to the utilization system. Prior art efforts to eliminate the high frequency harmonics by increasing the rise-time of the base drive waveform, raised the alternate problem of producing dead-zone or cross-over distortion in the output waveform. This cross-over distortion changes significantly when the temperature of the semiconductor components in the circuit varies substantially. The efficiency of operation of such a prior art converter is substantially impaired when exposed to temperature extremes, particularly higher temperatures, while the cross-over distortion becomes more pronounced at the lower temperatures.

OBJECTS OF THE INVENTION

It is therefore an object of the invention to enhance the temperature stability of a low noise D.C.—D.C. or D.C.-A.C. converter.

It is another object of the invention to eliminate the cross-over distortion in a low noise D.C.—D.C. or D.C.-A.C. converter.

It is still another object of the invention to enhance the efficiency of operation of a low noise D.C.—D.C. or D.C.-A.C. converter.

SUMMARY OF THE INVENTION

These and other objects, features and advantages of the invention are accomplished by the dynamic temperature compensating circuit disclosed herein. The circuit biases the bases of a first and second transistors connected in a common-emitter configuration, having collector emitter paths of the two transistors connected together in a current loop. The circuit includes a transformer having a primary coil connected to an input alternating current source. The transformer has a first secondary coil having a first side connected to the base of a first one of the transistors and a second secondary coil having a first side connected to the base of a second one of the transistors. The transformer's primary coil is poled in the same direction as the first and second secondary coils. The circuit further includes a first and a second resistor having a common first node connected to a first D.C. potential. The first resistor is connected between the first node and the first side of the first secondary coil and the second resistor is connected between the first node and the first side of the second secondary coil.

The circuit further includes a first and second diodes connected in parallel and oppositely poled between the second side of the first secondary coil and a second node connected to the common-emitters of the transistors. The circuit also includes a third and a fourth diodes connected in parallel and oppositely poled between the second side of the second secondary coil and the second node. A capacitor is connected between the second side of the first secondary coil and the first side of the primary coil. A resistor or wire is connected between the second side of the second secondary coil and the second side of the primary coil.

The second diode is poled in the same direction as the base-emitter junction of the first transistor, forward biasing the first transistor by the diode forward bias potential, when the transformer saturates and the first transistor has been in its off-state. This promotes the instantaneous conduction by the first transistor thereby avoiding cross-over distortion. The third diode is poled oppositely to the base-emitter junction of the second transistor, reverse biasing the second transistor by the diode forward bias potential, when the transformer saturates and the first transistor has been in its off-state. This prevents the second transistor from being in its on-state when the first transistor turns on. Current through these second and third diodes is maintained only during switching by current through the capacitor. A similar action occurs involving the first and fourth diodes when the transformer saturates and the second transistor has been in its off-state.

The diode forward bias potential of the second diode and the fourth diode, maintain equality of magnitude with the base-emitter forward bias potential of the first transistor and the second transistor, respectively, over a range of temperatures.

Thus, the dynamic temperature compensating circuit enhances the temperature stability of the switching waveform of a low noise D.C.—D.C. or D.C.-A.C. converter, eliminates cross-over distortion, and enhances its efficiency of operation.

DESCRIPTION OF THE DRAWINGS

These and other objects, features and advantages of the invention will be more particularly described with reference to the accompanying figure.

DISCUSSION OF THE PREFERRED EMBODIMENT

Figure 1:
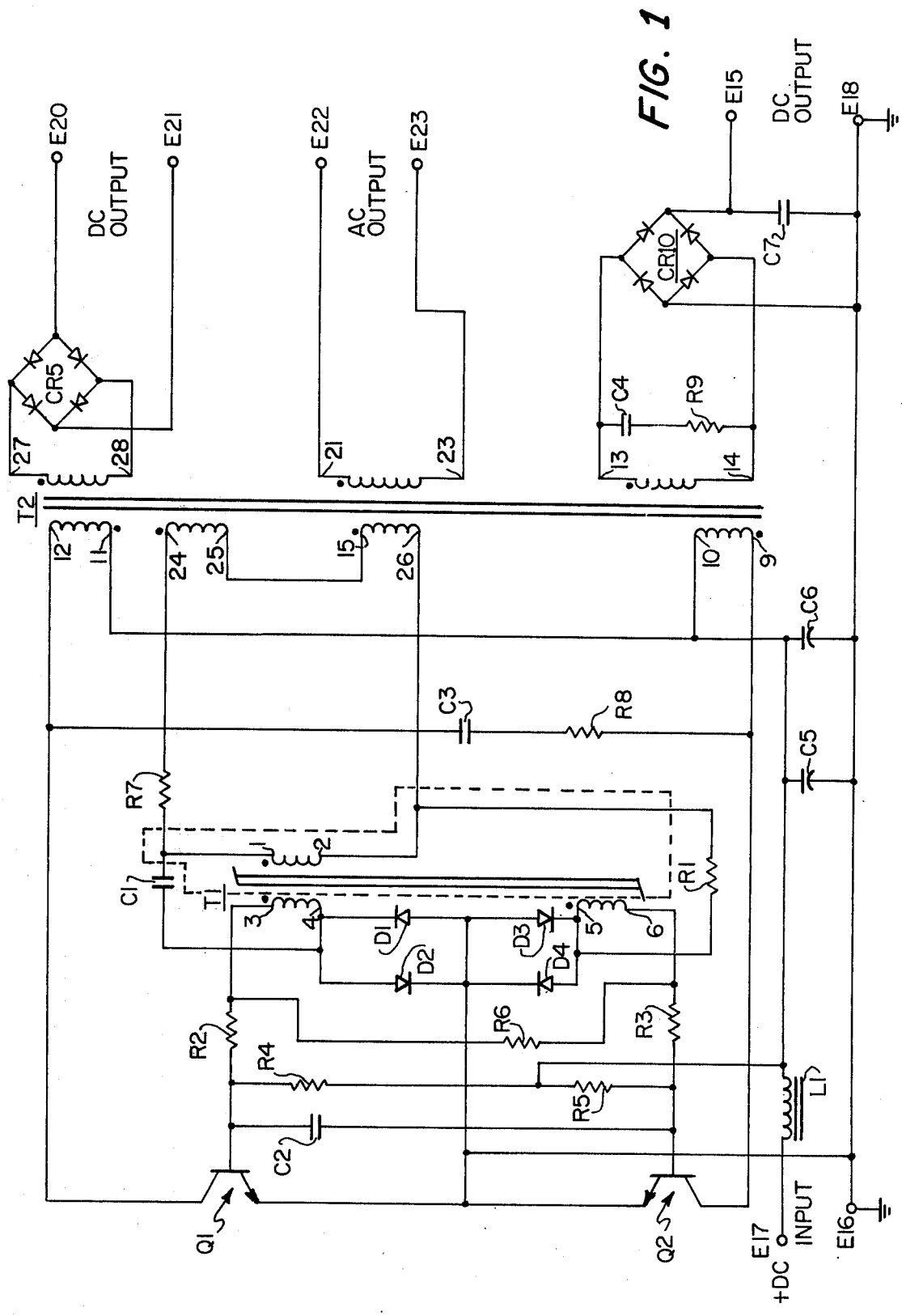
FIG. 1 illustrates a common-emitter D.C.—D.C. transistor converter employing the dynamic temperature compensating circuit.

FIG. 1 illustrates a standard slow-switching common-emitter D.C.—D.C. transistor converter which employs the dynamic temperature compensating circuit disclosed herein. The transistor converter comprises a pair of common-emitter transistors Q1 and Q2 which may be for example NPN transistors such as 2N2880 type. The collectors of Q1 and Q2 are connected, respectively, to terminal 12 of a 28 turn coil 11-12 and terminal 9 of a 28 turn coil 9-10 which serve as primary coils to the output transformer T2. Terminal 11 of coil 11-12 and terminal 10 of coil 9-10 are connected together to a first node which, in turn is connected through a 100 microhenry inductor L1 to the 24 volt positive D.C. input E17. A second, saturable core transformer T1 has a 120 turn primary coil 1-2 connected with terminal 1 connecting through a 4 ohm resistor R7 to terminal 24 of a 6 turn coil 24-25, a secondary coil of transformer T2. Terminal 25 of coil 24-25 is connected to terminal 15 of a 6 turn coil 26-15, another secondary coil of transformer T2. Terminal 26 of coil 26-15 is connected, in turn, to terminal 2 of coil 1-2 of the transformer T1. Current conducted through the transistors Q1 and Q2 drive the primary coils 9-10 and 11-12 of the transformer T2. The secondary coils 24-25 and 26-15 for the transformer T2 act as feedback coils which, in turn, energize the primary coil 1-2 of the transformer T1.

The base drive portion of the circuit shown in FIG. 1 is comprised of the saturable feedback transformer T1, a 0.22 microfarad capacitor C1, the 20 ohm base drive resistors R2 and R3, the 2 kilo-ohm resistors R4 and R5, the 1.2 kilo-ohm resistor R6, the 18 ohm resistor R1, the 0.18 microfarad capacitor C2, and the diodes D1, D2, D3, and D4. The transformer T1 coils 1-2, 3-4, and 5-6 are all poled in the same direction. T1 coils 3-4 and 5-6 are 60 turns, each. A second node in the circuit is connected to the ground input electrode E16. The positive pole of diode D1 and the negative pole of diode D2 are connected to the second node and, in turn, are connected in parallel to terminal 4 of coil 3-4. Terminal 4 of coil 3-4 is connected through the capacitor C1 to terminal 1 of coil 1-2. Terminal 3 of coil 3-4 is connected through the base drive resistor R2 to the base of the transistor Q1. Terminal 3 of coil 3-4 is also connected by means of a resistor R6 to terminal 6 of coil 5-6. The base of transistor Q1 is connected through the resistor R4 to the first node.

The positive pole of diode D3 and the negative pole of diode D4 are connected to the second node, and in turn, are connected in parallel to terminal 5 of the coil 5-6. Terminal 5 of coil 5-6 is, in turn, connected through resistor R1 to terminal 2 of coil 1-2. Terminal 6 of coil 5-6 is connected through the base drive resistor R3 to the base of transistor Q2. The base of transistor Q2 is also connected through the resistor R4 to the first node. This base drive circuit operates as an oscillator, periodically driving the bases of transistors Q1 and Q2 so as to alternately conduct currents through the primary coils 9-10 and 11-12 of the transformer T2, and is responsive to the feedback coils 24-25 and 26-15 of transformer T2, to regulate the frequency of the oscillation. Capacitors C2, C3 and C4, and resistors R8 and R9 serve to increase the rise-time of the switching waveform, damp out ringing and eliminate spikes from the switching waveform, thereby reducing high frequency harmonic content.

The operation of the dynamic temperature compensating circuit, in the context of the D.C.—D.C. converter shown in FIG. 1, follows. Without the regulation circuit described above, the converter operates as a normal slow-switching converter with positive feedback to sustain oscillation being applied from the feedback transformer T1 through the base drive resistors R2 and R3 to the bases of transistors Q1 and Q2. One transistor Q1 conducts until the core of the feedback transformer T1 saturates, removing any induced base drive current from the T1 coil 3-4 driving the transistor Q1. The magnetic flux in the core of the transformer T1 then collapses, inducing the voltage in the opposite direction across the coils 3-4 and 5-6 of transformer T1 which turns on the opposite transistor Q2. Current through the opposite transistor Q2 increases the voltage across its associated half of the output transformer T2 primary coil 9-10 inducing more voltage in the feedback secondary coils 24-25 and 26-15 of the transformer T2 and, in turn, in the feedback transformer T1, thereby increasing the base drive to transistor Q2. This process continues until the transistor Q2 saturates. The transistor Q2 then conducts until the core of the feedback transformer T1 saturates, and the operation repeats.

The dynamic temperature compensation circuit operates as follows. Assume transistor Q1 is in its conducting state. This state of affairs obtains because the terminal 3 of transformer T1 is positive with respect to the terminal 4 of transformer T1. T1 is being driven through the primary coil 1-2 from the floating secondary coils 24-25 and 26-15 of the output transformer T2. Base current flow into the transistor Q1 is from the terminal 3 of transformer T1 through the base drive resistor R2, through the base-emitter junction of transistor Q1, into the second node, through the diode D1 and into terminal 4 of coil 3-4 of transformer T1.

It is important to note that the voltage at terminal 4 of transformer T1 is at one forward bias potential VD for the diode D1, below ground potential. For a silicon diode at room temperature, this corresponds to a voltage at terminal 4 of approximately minus 0.7 volts. At the same time, transistor Q2 is biased off by the coil 5-6. Current flow through the converter start up resistor R5, and current flow through resistor R6 forward biases the diode D4, causing the voltage at terminal 5 of the coil 5-6 of transformer T1 to be the forward bias diode potential VD of the diode D4, above ground potential. For a silicon diode at room temperature, terminal 5 would be at approximately plus 0.7 volts above ground. When the voltage across the transformer T1 collapses in the process of switching, the potential of minus VD at terminal 4 of coil 3-4 and of plus VD at terminal 5 of coil 5-6 will be maintained by the current flow through the capacitor C1 and the resistor R1 and the coil 1-2 of the transformer T1. This current flow is produced by the change in the voltage across the coil 1-2 of transformer T1.

After the voltage across transformer T1 has reached zero, the base of transistor Q1 will have a negative bias of minus VD, if the voltage drop of the base drive resistor R2 is neglected. The base of transistor Q2 will have a positive bias of plus VD plus small increment due to the current from the start up resistor R5, which produces a voltage drop across the base drive resistor R3. Thus, the transistor Q2 will begin to conduct immediately when the driving voltage on the transformer T1 reaches zero, thereby eliminating the dead-zone or cross-over distortion present in prior art transistor converter circuits at zero transformer potential.

Some prior art transistor converter circuits employ speed up capacitors to eliminate the cross-over distortion problem. These are by pass capacitors across the base drive resistors R2 and R3. Such capacitors speed up the switching time for the oscillating converter and cannot be used for low noise converters where slow switching in the oscillator is desired.

The negative bias on the base of transistor Q1 insures that transistor Q1 will switch off before the transistor Q2 begins to conduct, thus preventing transistor power dissipation caused by both transistors being partially on at the same time. This operation insures a high efficiency in a slow switching, low noise converter.

When the transistor Q2 has fully switched on, or slightly before depending upon circuit values, current through the base drive resistor R3 will exceed the current through resistor R1 and capacitor C1, causing the diode D4 to stop conducting and the diode D3 to begin conducting. Since the voltage across the transformer T1 has stopped changing, the current through the capacitor C1 and the resistor R1 will diminish, and current through the resistor R4 and R6 will begin to charge the capacitor C1 until the diode D1 stops conducting and the diode D2 begins conducting. At this point, the circuit is in the opposite state from what it was at the beginning of this description, with the transistor Q2 conducting and all conditions reversed. The switching cycle now proceeds in the same manner until the transistor Q1 is conducting again.

The temperature compensation which the diodes D1, D2, D3, and D4 provide for the circuit shown in FIG. 1, is described as follows. Diodes D1 and D2 are connected in parallel and oppositely poled between terminal 4 of coil 3–4 and the second node connected to the commonly connected emitters of transistors Q1 and Q2. Diodes D3 and D4 are connected in parallel and oppositely poled between terminal 5 of coil 5–6 and the second node. Diode D2 is poled in the same direction as the base-emitter junction of transistor Q1, and forward biases transistor Q1 by the diode forward bias potential VD when the transformer T1 saturates and the transistor Q1 has been in its off-state. The diode forward bias potential VD of D2 maintains an equality of magnitude with the base-emitter forward bias potential of transistor Q1 over a range of temperatures because both the diode D2 and the transistor Q1 are composed of the same material, either silicon or germanium. In this manner, the biasing potential on the transistor Q1 will always remain sufficient to forward bias the transistor in this state, through a range of temperatures.

By the same token, the diode D4 poled in the same direction as the base-emitter junction of the transistor Q2, forward biases the transistor Q2 by the diode forward bias potential VD when the transformer T1 saturates and the transistor Q2 has been in its off-state. The diode forward bias potential of the diode D4 maintains an equality of magnitude with the base-emitter forward bias potential of the transistor Q2 over a range of temperatures because both the diode D4 and the transistor Q2 are composed of the same semi-conductor material.

It is seen that the circuit of FIG. 1 can have a D.C. output as at terminals E20 and E21 so as to operate as a D.C.—D.C. converter. It is seen also that the circuit of FIG. 1 can operate to generate an A.C. output at terminals E22 and E23 so as to operate as a D.C.-A.C. converter.

Figure 2:
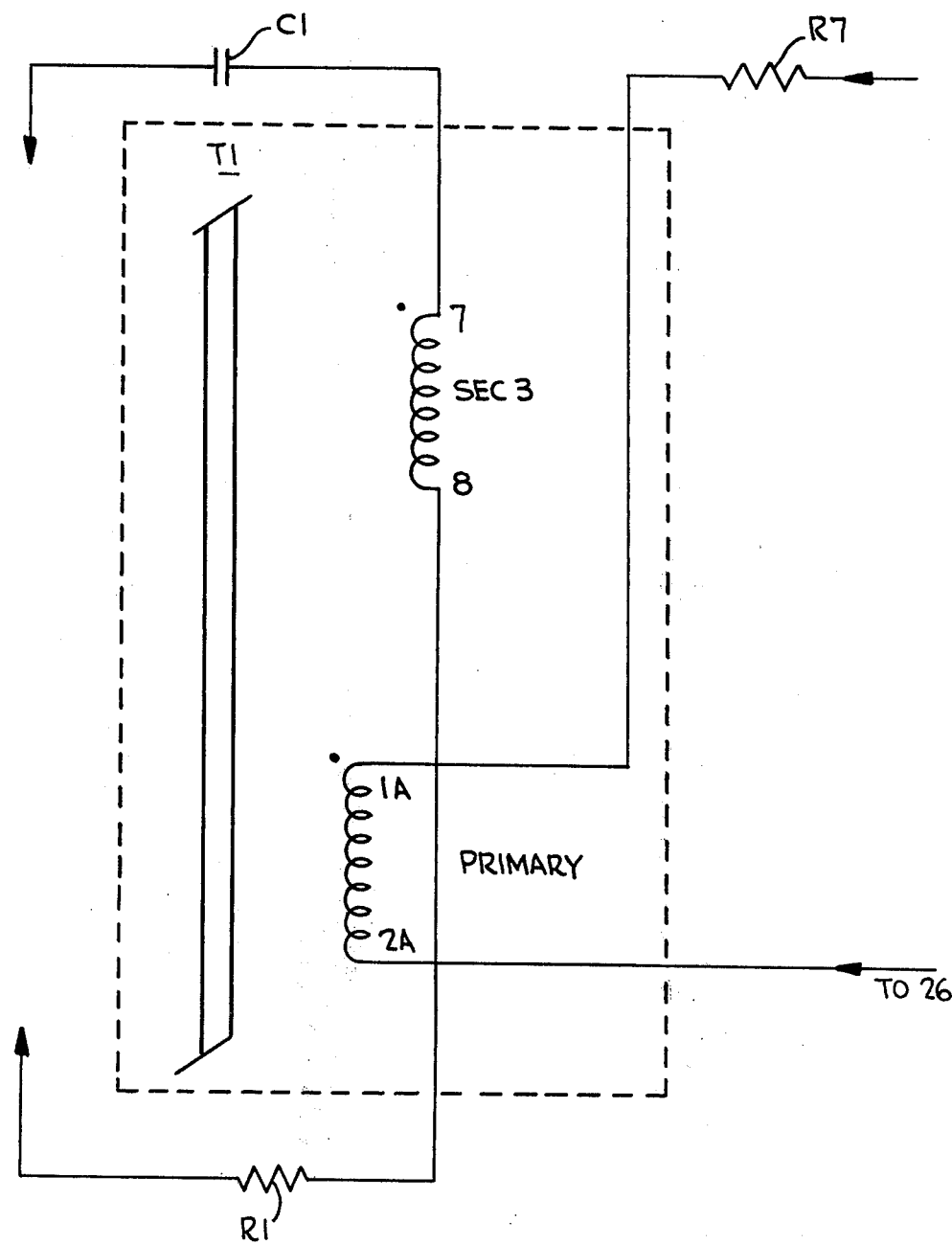
FIG. 2 illustrates a second possible configuration of the base driving transformer shown in FIG. 1.

FIG. 2 illustrates a more generalized embodiment of the driving transformer illustrated in the dashed lines of FIG. 1. A third secondary winding 7–8 is shown utilized in the temperature compensating network, while primary winding 1A–2A performs its driving function. Therefore, primary winding 1A–2A is not required to function in a dual capacity as winding 1–2 does so in FIG. 1. It is understood that transformer T1 can be designed in a variety of ways by those skilled to perform the function described herein, this embodiment being simply the most illustrative.

It should be noted that the resistor R6 may not be necessary if the current through the resistors R4 and R5 is sufficient to charge the capacitor C1 in the alloted time. Similarly, if another means for converter start up is used, such as in a power amplifier type converter where the final stages are driven from a separate waveform generator, the resistors R4 and R5 may not be necessary. The resistor R6 might also be connected base-to-base for other applications. In some applications, neither the resistors R4, R5, nor R6 may be needed, since the capacitor C1 may be charged sufficiently by the current from the changing voltage across the transformer T1. If the rise-time characteristics of the driving waveform are well controlled, the resistor R1 may be replaced by a short circuit.

As should now be appreciated, the objectives set forth at the outset of this specification have been successfully achieved. It should further be understood that the invention is not to be limited to the exact details discussed in the preferred inventive embodiment, for obvious modifications will occur to persons skilled in the art.

What is claimed is:

1. A dynamic temperature compensating circuit for biasing the bases of first and second transistors connected in common emitter configuration, having collector-emitter paths of the two transistors connected together in a current loop, comprising:

a transformer having a primary coil connected to an input alternating current source, a first secondary coil having a first side connected to the base of a first one of said transistors, and a second secondary coil having a first side connected to the base of a second one of said transistors, with said primary and first and second secondary coils being poled in the same direction;

a first and a second resistor having a common first node connected to a first D.C. potential, said first resistor being connected between said first node and either side of said first secondary coil and said second resistor being connected between said first node and either side of said second secondary coil;

a first and second diodes connected in parallel and oppositely poled between the second side of said first secondary coil and a second node connected to the common emitters of said transistors;

a third and fourth diodes connected in parallel and oppositely poled between the second side of said second secondary coil and said second node;

a capacitor connected between said second side of said first secondary coil and a first side of said primary coil;

a resistance connected between said second side of said second secondary coil and the second side of said primary coil;

said second diode poled in the same direction as the base-to-emitter junction of said first transistor, forward biasing said first transistor by the diode forward bias potential, when said transformer saturates and said first transistor has been in its off-state, so as to promote instantaneous conduction by said first transistor thereby avoiding cross-over distortion;

said diode forward bias potential of said second diode maintaining equality with the base-to-emitter forward bias potential of said first transistor over a range of temperatures;

whereby the output characteristics of said current loop are compensated for temperature fluctuations.

2. The apparatus of claim 1, wherein:

said third diode, poled oppositely to the base-emitter junction of said second transistor, reverse biasing said second transistor by the diode forward bias potential, when said transformer saturates and said first transistor has been in its off-state, preventing said second transistor from being on when said first transistor turns on.

3. The apparatus of claim 2, wherein:

said fourth diode poled in the same direction as the base-emitter junction of said second transistor, forward biasing said second transistor by the diode forward bias potential, when said transformer saturates and said second transistor has been in its off-state, so as to promote instantaneous conduction by said second transistor thereby avoiding cross-over distortion;

said diode forward bias potential of said fourth diode maintaining equality with the base-to-emitter forward bias potential of said second transistor over a range of temperatures.

4. The apparatus of claim 3, wherein:

said first diode, poled oppositely to the base-emitter junction of said first transistor, reverse biasing said first transistor by the diode forward bias potential, when said transformer saturates and said second transistor has been in its off-state, preventing said first transistor from being on when said second transistor turns on.

5. The apparatus of claim 4, wherein:

said second diode and said first transistor are composed of the same semi-conductor material; and said fourth diode and said second transistor are composed of the same semi-conductor material.

6. The apparatus of claim 5, which further comprises:

an output transformer with a primary coil connected in said current loop and a feedback secondary coil coupled thereto, which serves as said input alternating current source.

7. The apparatus of claim 6, which further comprises:

a secondary output coil coupled to said output transformer for outputting an alternating current;

whereby said dynamic temperature compensating circuit operates in a D.C.–A.C. converter.

8. The apparatus of claim 7, which further comprises:

a rectification means connected to the output of said secondary output coil, for outputting a direct current;

whereby said dynamic temperature compensating circuit operates in a D.C.—D.C. converter.

9. A dynamic temperature compensating circuit for biasing the bases of first and second transistors connected in common emitter configuration, having collector-emitter paths of the two transistors connected together in a current loop, comprising:

a transformer having a primary coil connected to an input alternating current source, a first secondary coil having a first side connected to the base of a first one of said transistors, and a second secondary coil having a first side connected to the base of a second one of said transistors, with said primary and first and second secondary coils being poled in the same direction;

a first and a second resistor having a common first node connected to a first D.C. potential, said first resistor being connected between said first node and either side of said first secondary coil and said second resistor being connected between said first node and either side of said second secondary coil;

a first and second diodes connected in parellel and oppositely poled between the second side of said first secondary coil and a second node connected to the common emitters of said transistors;

a third and fourth diodes connected in parallel and oppositely poled between the second side of said second secondary coil and said second node;

said transformer having a third secondary coil poled in the same direction as said primary coil;

a capacitor connected between said second side of said first secondary coil and a first side of said third secondary coil;

a resistance connected between said second side of said second secondary coil and a second side of said third secondary coil;

said second diode poled in the same direction as the base-to-emitter junction of said first transistor, forward biasing said first transistor by the diode forward bias potential, when said transformer saturates and said first transistor has been in its off-state, so as to promote instantaneous conduction by said first transistor thereby avoiding cross-over distortion;

said diode forward bias potential of said second diode maintaining equality with the base-to-emitter forward bias potential of said first transistor over a range of temperatures;

whereby the output characteristics of said current loop are compensated for temperature fluctuations.

10. A dynamic temperature compensating circuit for biasing the bases of first and second transistors connected in common emitter configuration, having collector-emitter paths of the two transistors connected together in a current loop, comprising:

a transformer having a primary coil connected to an input alternating current source, a first secondary coil having a first side connected to the base of a first one of said transistors, and a second secondary coil having a first side connected to the base of a second one of said transistors, with said primary and first and second secondary coils being poled in the same direction;

a first and second diodes connected in parallel and oppositely poled between the second side of said first secondary coil and a second node connected to the common emitters of said transistors;

a third and fourth diodes connected in parallel and oppositely poled between the second side of said second secondary coil and said second node;

said transformer having a third secondary coil poled in the same direction as said primary coil, a second side of said third secondary coil connected to said second side of said second secondary coil;

a capacitor connected between said second side of said first secondary coil and a first side of said third secondary coil;

a means for charging said capacitor in the proper direction so as to give a slight reverse bias to whichever of said first and second transistors is on and a slight forward bias to whichever of said first and second transistors is off during the time when said switching transients have died down;

said second diode poled in the same direction as the base-to-emitter junction of said first transistor, forward biasing said first transistor by the diode forward bias potential, when said transformer saturates and said first transistor has been in its off-state, so as to promote instantaneous conduction by said first transistor thereby avoiding cross-over distortion;

said diode forward bias potential of said second diode maintaining equality with the base-to-emitter forward bias potential of said first transistor over a range of temperatures; whereby the output characteristics of said current loop are compensated for temperature fluctuations.

11. The apparatus of claim 10, which further comprises a resistance connected in series between said second side of said second secondary coil and said second side of said third secondary coil.

12. The apparatus of claim 10 wherein said means for charging comprises a second resistance connected between said first side of said first secondary coil and either side of said second secondary coil.

13. The apparatus of claim 10 wherein said means for charging comprises a second resistance connected between said first side of said second secondary coil and either side of said first secondary coil.

* * * * *